United States Patent [19]

Hashizume

[11] Patent Number: 4,628,142
[45] Date of Patent: Dec. 9, 1986

[54] SOLAR TRACKING MECHANISMS

[75] Inventor: Kenichi Hashizume, Tokyo, Japan

[73] Assignee: Kabushiki Kaisha Toshiba, Kawasaki, Japan

[21] Appl. No.: 712,539

[22] Filed: Mar. 18, 1985

[30] Foreign Application Priority Data

Mar. 19, 1984 [JP] Japan .................................. 59-51103

[51] Int. Cl.⁴ ........................... H02N 6/00; F24J 3/02
[52] U.S. Cl. .................................... 136/246; 126/424; 126/245; 250/203 R; 353/3
[58] Field of Search ................ 136/246; 126/424, 425; 250/203 S; 353/3

[56] References Cited

U.S. PATENT DOCUMENTS

| | | | |
|---|---|---|---|
| 3,982,526 | 9/1976 | Barak | 126/425 |
| 4,044,752 | 8/1977 | Barak | 126/425 |
| 4,262,654 | 4/1981 | Ward | 126/425 |
| 4,283,588 | 8/1981 | Zitzelsberger | 136/246 |
| 4,351,319 | 9/1982 | Robbins, Jr. | 126/425 |
| 4,365,616 | 12/1982 | Vandenberg | 126/424 |
| 4,469,938 | 9/1984 | Cohen | 250/203 R |
| 4,498,456 | 2/1985 | Hashizume | 126/425 |

Primary Examiner—Arron Weisstuch
Attorney, Agent, or Firm—Schwartz, Jeffery, Schwaab, Mack, Blumenthal & Evans

[57] ABSTRACT

A solar self-tracking mechanism for continuously tracking the movement of the sun with time comprises a solar radiant energy receiver secured to a base set on the ground and rotatable about a rotating shaft which extends horizontally in an east-west direction and a plurality of compound parabolic concentrators secured to both longitudinal edges of the solar receiving mechanism in parallel to the rotating shaft. The sun energy concentrated on suitable means such as shape memory alloy coil or solar cell module located at a position coincident with the focal line of the compound parabolic concentrator is transferred to a mechanism for driving the rotating shaft of the solar radiant energy receiver thereby to rotate the same and continuously obtain the solar radiant energy.

10 Claims, 8 Drawing Figures

SOLAR TRACKING MECHANISMS

BACKGROUND OF THE INVENTION

This invention relates to a solar tracking mechanism for continuously tracking the movement of the sun with time to effectively obtain radiant energy from the sun.

Recently, it has been required to develop a solar tracking technology of concentrating type for effectively obtaining radiant energy from the sun. For these purposes, for example, various tracking systems each utilizing a driving motor and electronic control devices therefor were developed or proposed. However, these tracking systems require a continuous electric power supply and are somewhat complicated for technology transfer to developing countries where sunshine is so abundant that the utilization of solar energy is favorable while, however, electric power supply networks have not yet been adequately developed. Taking the above facts into consideration, some tracking mechanisms for solar collectors were proposed in, for example, U.S. Pat. Nos. 3,982,526, 4,044,752, and 4,356,616, which require no electric power supply and no electronic control devices for simplifying their mechanisms.

Each of the former two U.S. Patents discloses a device which is provided for turning a solar collector about either a polar axis or an east-west horizontal axis. The devices include heat responsive elements which exert forces when they are heated by the radiant energy from the sun and become limp when shaded. When the heat responsive element is heated by the solar energy within a certain range of the azimuth or altitude angle, the solar collector can be rotated to a position to face the position of the sun. The latter one U.S. Patent also discloses a device which is provided for turning a parabolic trough solar collector about an east-west horizontal axis and the alignment of the solar collector is accomplished by the heating of a long wire held in tension by a spring.

These ideas in prior patents, however, cannot always satisfy our requirement for tracking mechanisms of solar collectors for the reason that the tracking mechanisms of the former two patents can change their position to only two, three at maximum, positions of the movement of the sun with time. The latter one patent cannot track the sun after the sun has been covered with clouds for a certain time period, and from the same reason, tracking of the sun about the north-south axis cannot be realized. Furthermore, the application of this mechanism is limited to solar collectors with a parabolic trough reflector. These defects or disadvantages of the tracking mechanisms disclosed in the prior patents will be understood by those skilled in the art from the disclosures of these patents.

In addition, an improved self-tracking mechanism for a solar collector has been proposed by the same inventor of this application as U.S. Pat. No. 4,498,456, for eliminating the defects encountered with the prior art such as the three U.S. Patents referred to above. Although this self-tracking mechanism can track the movement of the sun with time, this mechanism can perform the tracking operation only intermittently.

SUMMARY OF THE INVENTION

An object of this invention is to eliminate defects or disadvantages in the prior art by providing a solar tracking mechanism with no electric power supply and no electric control devices for tracking the sun.

Another object of this invention is to provide a solar tracking mechanism capable of substantially continuously tracking the sun movement with time, even if the sun disappears for a relatively long time, by utilizing a plurality of compound parabolic concentrators arranged in the east-west direction.

According to this invention, for achieving these and other objects, there is provided a solar tracking mechanism for continuously tracking the movement of the sun with time secured to a base set on the ground through a frame and the solar tracking mechanism comprises a solar radiant energy receiver secured to be rotatable about a rotating shaft which is supported by the frame and extends horizontally in the east-west direction, a device for catching a solar beam of the sun travelling with time, and a mechanism operatively connected to the device for rotating the rotating shaft together with the solar radiant energy receiver.

In preferred embodiments, the solar radiant energy receiver comprises a parabolic trough reflector or a solar cell module, and the device for catching the movement of the sun comprises a plurality of compound parabolic concentrators.

According to this invention, the self solar tracking mechanism is constituted by a solar tracking device attached to the solar radiant energy receiver and preferably composed of the compound parabolic concentrators, so that the solar beam of the sun can be continuously caught and even in a case where the sun is covered with clouds or disappears, the solar tracking mechanism can immediately catch the solar beam when the sun again appears.

DESCRIPTION OF THE PREFERRED EMBODIMENTS

Figure 1:
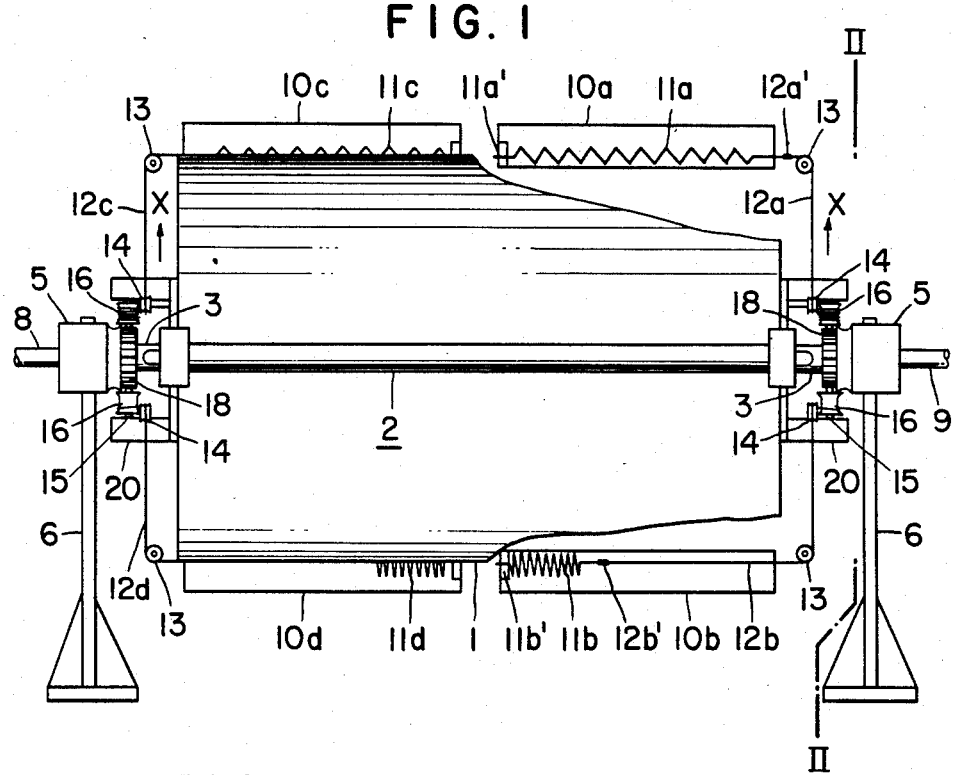
FIG. 1 shows a front view of a first embodiment of a solar tracking mechanism according to this invention.
Figure 2:
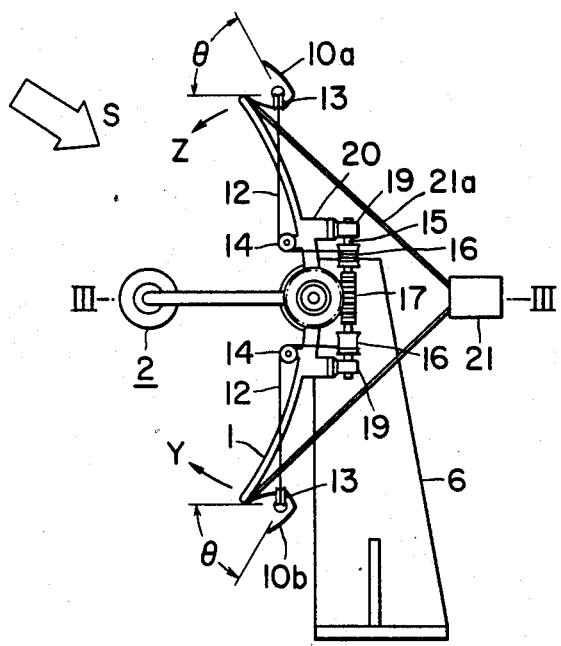
FIG. 2 shows a side view, partially in section, taken along line II—II shown in FIG. 1.
Figure 3:
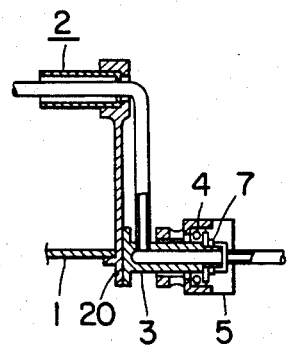
FIG. 3 shows a partial sectional view taken along line III—III shown in FIG. 2.

A preferred embodiment of this invention will be disclosed hereunder in conjunction with FIGS. 1 through 3, in which a solar radiant energy receiver is essentially composed of a parabolic trough reflector 1 and a heat collecting tube 2 disposed on the focal line of the parabolic trough reflector 1. The thus composed solar radiant energy receiver is constructed to be rotatable about the central axis of a rotating shaft of the receiver which extends horizontally in the east-west direction. The rotating shaft 3 is a supported at its both end portions by bearings 4 disposed in bearing boxes 5 supported by support bases 6 which are set on the ground. Shaft seals 7 are disposed at both ends of the rotating shaft 3. Heat transfer medium such as heat transfer oil or pressurized hot water is continuously supplied from a heat transfer medium inlet pipe 8 into the heat collecting tube 2 and discharged through a heat transfer medium outlet pipe 9.

A plurality of compound parabolic concentrators 10a, 10b, 10c, and 10d in this embodiment (called CPC hereinafter) are secured to both edge portions of the parabolic trough reflector 1 in parallel to the rotating shaft 3. The CPCs of this embodiment act as a radiant energy collector and can concentrate the solar energy within a range of about an angle $\theta$ on their focal lines, respectively, as shown in FIG. 2. At positions corresponding to the focal lines of the respective CPCs, there are provided shape memory alloy (SMA) coils 11a, 11b, 11c, and 11d, each having one end secured to one end of the respective CPCs 10a through 10d as shown in FIG. 1, for example at a point 11a', and having the other end connected to one end of tension wires 12a, 12b, 12c, and 12d, respectively, for example through a connector 12a'. Each of the SMA coils 11a through 11d is treated so that it shrinks into a tightly wound-up coil shape when it is heated and it may be covered with a glass tube, not shown. An Ni-Ti alloy wire is preferably used for the SMA coils. The other ends of the tension wires 12a through 12d are wound up, through pulleys 13 and 14, on wire drums 16 secured to drive shafts 15 at both sides of the parabolic trough reflector 1. On each drive shaft 15 is mounted a worm gear 17 which is meshed with a worm wheel 18 secured to the bearing box 5 of the base 6. The drive shafts 15 are operatively connected to the rotating shaft 3 through bearings 19 and support frames 20 at both ends thereof.

A counter weight 21 is connected to the reflector 1 through rod-like members 21a so that the center of gravity of the structure rotating together with the parabolic trough reflector 1 is always aligned with the central axis of the rotating shaft 3.

The solar tracking mechanism according to the embodiment of this invention shown in FIGS. 1 through 3 operates as follows.

Supposing that the solar radiation is now directed as shown by an arrow S in FIG. 2, the solar energy is collected by the CPCs 10a and 10c secured to the upper edge of the reflector 1 and concentrated on their focal lines at which the SMA coils 11a and 11c are positioned. The SMA coils 11a and 11c are then heated and shrink in a preliminarily memorized shape of tightly wound-up coil form, and the tension wires 12a and 12c connected to the SMA coils 11a and 11c are pulled in arrowed directions X as shown in FIG. 1. Then, the tension wires 12a and 12c wound up on the wire drums 16 are wound off thereby to rotate the worm gears 17, and in turn, rotate the whole structure including the parabolic trough reflector 1 and the heat collecting tube 2 through the worm wheels 18 in a direction Y as shown in FIG. 2. When the direction of the parabolic trough reflector 1 coincides with the direction of the solar radiation, the solar energy is not concentrated on the focal lines of all of the CPCs 10a through 10d and the shrinkage of the SMA wires stop thereby not to further rotate the reflector 1 and the associated structure. Thereafter, when the sun moves with time to a lower position in the afternoon, for example, the CPCs 10b and 10d start to concentrate the solar energy on their focal lines and the solar tracking mechanism of this embodiment is again rotated in a direction Z as shown in FIG. 2 is accordance with the movement of the sun substantially in the same manner as described with respect to the CPCs 10a and 10c.

In the embodiment of this invention illustrated in FIG. 1, although two pairs of the CPCs are provided, these CPCs may be reduced in number to one pair thereof, for example, consisting of the CPCs 10a and 10b or 10c and 10d. Linear Fresnel lens or parabolic trough reflectors may be used as the CPCs 10a through 10d for the solar tracking mechanism of this invention. However, the CPCs are more suitable for the tracking mechanism because the solar energy collecting range (i.e., angle $\theta$ in FIG. 2) is larger than those of others. Accordingly, even in a case where the sun is covered by clouds for relatively long periods, the solar tracking mechanism of this invention can immediately track the movement of the sun again when the sun again appears in the solar energy collecting range.

Figure 4:
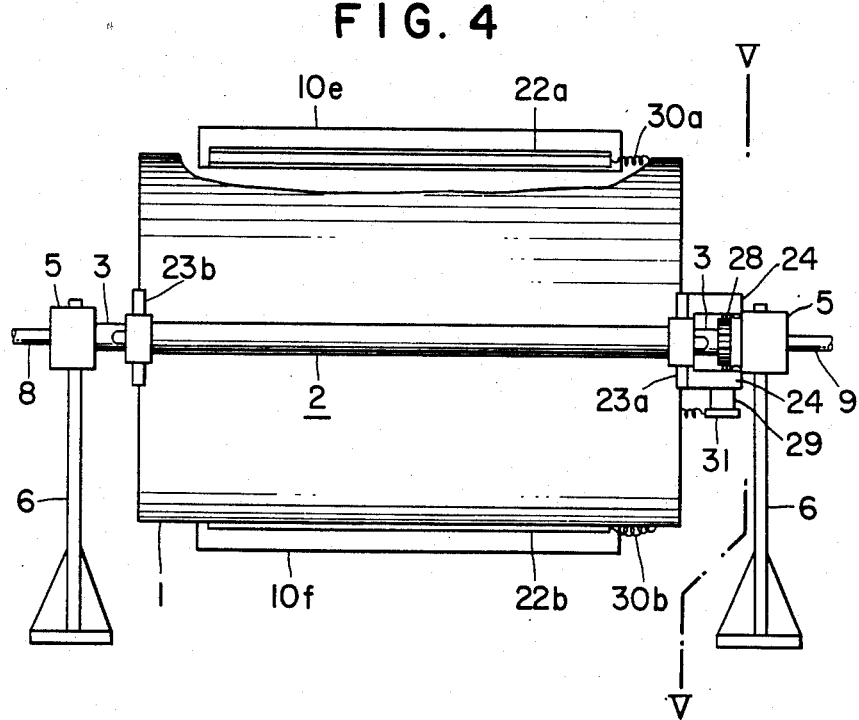
FIG. 4 shows a front view of a second embodiment of a solar tracking mechanism according to this invention.

Another embodiment of this invention will be described hereinafter with reference to FIGS. 4 through 6, in which like reference numerals are added to the elements corresponding to those referred to with respect to the first embodiment shown in FIGS. 1 through 3.

A pair of compound parabolic concentrators (CPC) 10e and 10f are attached to both longitudinal edge portions of the parabolic trough reflector 1 and solar cell modules 22a and 22b are arranged at positions on the focal lines of the CPCs 10e and 10f, respectively. The parabolic trough reflector 1 and the heat collecting tube 2 are held by the rotating shaft 3 in a fixed manner by means of supporting frames 23a and 23b and an arm member 24 is secured to one of these supporting frames so as to project outwardly. The arm member 24 holds the drive shaft 25 through the bearing 26. On the drive shaft 25 is mounted the worm gear 27, which is in turn meshed with the worm wheel 28, and one end of the drive shaft 25 is operatively coupled with a rotating shaft of a D.C. electric motor 29.

A counter weight 21 is also provided in this embodiment for the parabolic trough reflector 1 through rod-like members 21a so that the center of gravity of the structure rotatable together with the reflector 1 is always aligned with the axis of the rotation of the reflector 1. Outputs from the solar cell modules 22a and 22b are transferred to the D.C. motor 29 through electric lead wires 30a and 30b and a switching circuit 31, which is a forward and reverse switching circuit for a direct current motor and is of a known type as shown in FIG. 6, for example. The switching circuit 31 acts to drive the D.C. motor 29 forwardly or in reverse in accordance with the intensity of the output power of the solar cell modules 22a and 22b. The circuit 31 includes resistors R and transistors $TR_1$ and $TR_2$ arranged as shown in FIG. 6.

The solar tracking mechanism according to the second embodiment of this invention operates as follows.

Figure 5:
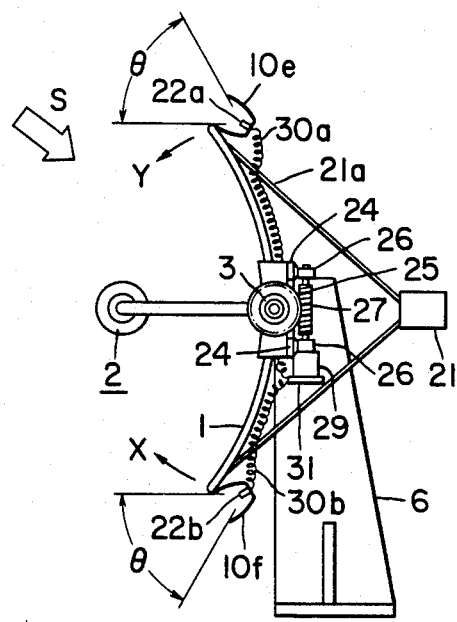
FIG. 5 shows a side view, partially in section, taken along line V—V shown in FIG. 4.
Figure 6:
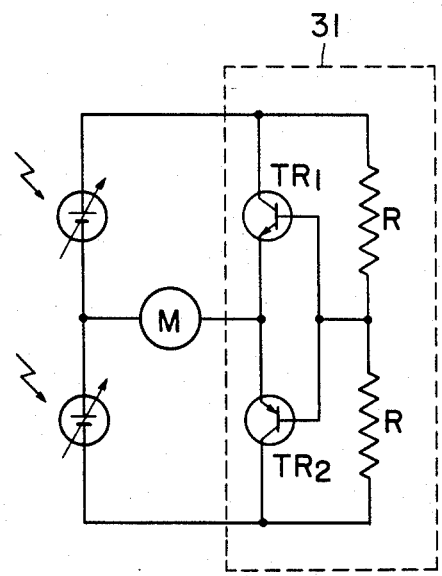
FIG. 6 shows a diagram of a switching circuit adapted to the solar tracking mechanism shown in FIG. 4.

Supposing that the solar radiation is directed as shown by arrow S in FIG. 5, the solar energy directed on the surface of the CPC 10e attached to the upper edge portion of the parabolic trough reflector 1 is concentrated on the solar cell module 22a arranged on the focal line of the CPC 10e, thereby increasing output power from the solar module 22a so as to be much larger than that of the solar module 22b located on the focal line of the other CPC 10f secured to the lower edge of the reflector 1. The switching circuit 31 connected through the lead wire 30a to the solar cell module 22a then operates to forwardly drive the D.C. motor 29 thereby to rotate the structure including the parabolic trough reflector 1 in a direction X shown in FIG. 5.

When the parabolic trough reflector 1 rotates continuously with time and directly faces the sun, the solar energy is not concentrated by the CPCs 10e and 10f on their focal lines, so that the output of the solar cell module 22a is rapidly reduced, and finally, the drive of the D.C. motor 29 stops. When the attitude of the sun lowers with time in the afternoon, the solar energy is again collected by the CPC 10f and the output of the solar cell module 22b increases thereby to reversely rotate the D.C. motor 29 and then rotate the structure including the parabolic trough reflector 1 in a direction Y shown in FIG. 5.

With the embodiments and preferred alternations thereof described hereinabove, a heat transfer medium such as heat transfer oil or pressurized hot water flows continuously through the heat collecting tube 2 and is continuously heated as long as the sun is present, thereby to obtain a high temperature fluid of about 150°-300° C., which can be utilized for various industrial processes or fields directly after performing a heat exchanging operation.

Figure 7:
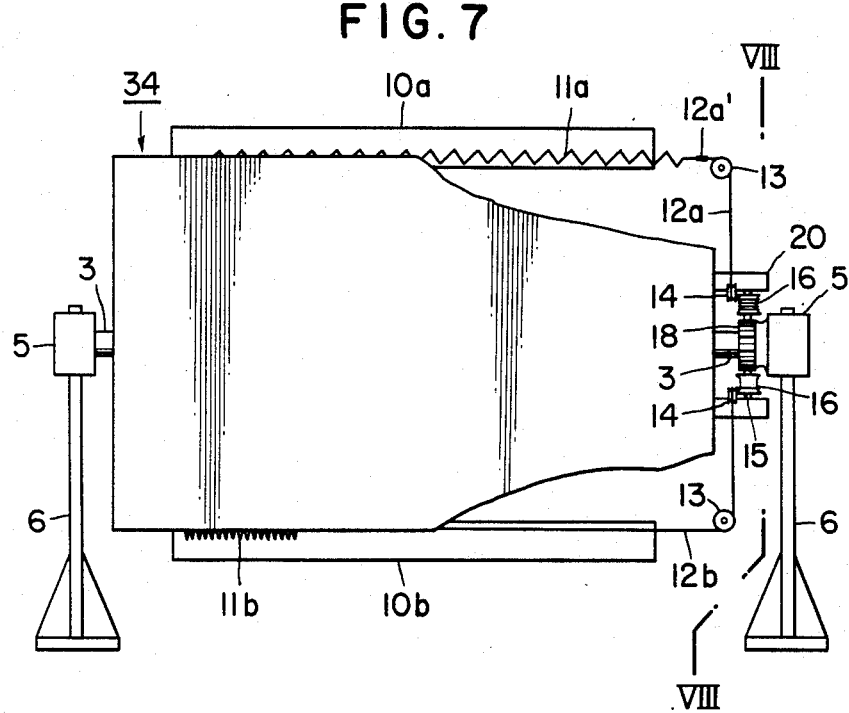
FIG. 7 shows a front view of a third embodiment of a solar tracking mechanism according to this invention.
Figure 8:
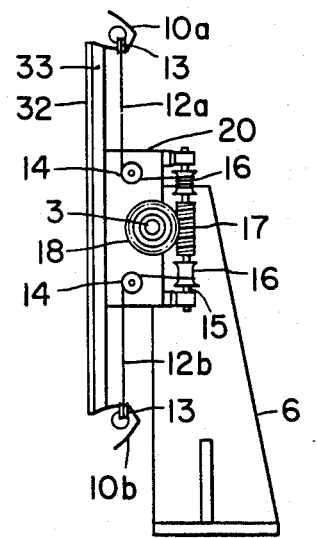
FIG. 8 shows a side view, partially in section, taken along a line VIII—VIII shown in FIG. 7.

FIGS. 7 and 8 show a further embodiment of a solar tracking mechanism of this invention, in which like reference numerals are added to the elements or members corresponding to those shown in FIGS. 1 through 3 and explanation thereof is now omitted.

In this embodiment, the solar radiant energy receiver comprises a solar cell panel 34 consisting of a plurality of solar cell modules 32 and a support frame 33 for supporting the same. The solar cell panel 34 is secured to the rotating shaft 3 through the supporting frame 20 and a pair of compound parabolic concentrators 10a and 10b (CPC) are secured to both the longitudinal edges of the solar cell panel 34 in parallel to the rotating shaft 3. On the focal lines of the CPCs 10a and 10b are arranged shape memory alloy (SMA) coils 11a and 11b which shrink or extend in the manner as disclosed with reference to the embodiment shown in FIGS. 1 through 3. The solar tracking operation or mechanism of this embodiment is substantially the same as that described before with reference to the first embodiment and the electric power from the solar cell modules 32 is externally taken out through a flexible power cable, not shown. It will be of course understood that two pairs of CPCs can be attached to both the longitudinal edges of the solar cell panel 34 as shown in FIG. 1.

In a further modification alternation, a flat plate solar collector may be used as a solar radiant energy collecting mechanism in place of the solar cell modules or the parabolic trough reflector.

It will also be understood by those skilled in the art that the foregoing descriptions relate to some preferred embodiments of the solar tracking mechanism and that various changes and modifications may be made without departing from the spirit and scope of the claims appended hereto.

What is claimed is:

1. A solar collector including a tracking mechanism for continuously tracking the movement of the sun with time, comprising:
   a solar radiant energy receiver secured to be rotatable about a rotating shaft which is supported by a base having a frame;
   means connected to said solar radiant energy receiver for tracking the movement of the sun with time; and
   means operatively connected to said sun tracking means for rotating said rotating shaft of said solar radiant energy receiver;
   said sun tracking means comprising at least a pair of compound parabolic concentrators, each being secured to a horizontal edge of said solar radiant energy receiver in parallel to said rotating shaft, and shape memory alloy coils each having one end connected to one end of a respective said compound parabolic concentrator and located at a position coincident with a focal line of the respective compound parabolic concentrator.

2. The solar collector according to claim 1, wherein said shape memory alloy coil includes means for shrinking into a memorized tightly wound-up coil shape when heated to a predetermined temperature, the other end of said shape memory alloy coil being connected to one end of a tension wire, the other end of said tension wire being connected to said means for rotating said rotating shaft.

3. The solar collector according to claim 2, wherein said means for rotating said rotating shaft comprises a wire wound around a drum which pulls said tension wire via a pulley, a worm gear mounted on a drive shaft of said wire wound drum, and a worm wheel secured to said base and meshed with said worm gear thereby to rotate said solar radiant energy receiver in accordance with the shrinkage of said shape memory alloy coil.

4. The solar collector according to claim 1, wherein said solar radiant energy receiver comprises a parabolic trough reflector.

5. The solar collector according to claim 1, wherein said solar radiant energy receiver comprises a solar cell panel having a plurality of solar cell modules and a support frame for supporting said modules, and wherein said shape memory alloy coil includes means for shrinking into a memorized tightly wound-up coil shape when heated to a predetermined temperature, and wherein the other end of each said shape memory alloy coil is connected to one end of a tension wire, the other end of said tension wire being connected to said means for rotating said rotating shaft.

6. The solar collector according to claim 5, wherein said means for rotating said rotating shaft comprises a wire wound around a drum which pulls said tension wire via a pulley, a worm gear mounted on a drive shaft of said wire wound drum, and a worm wheel secured to said base and meshed with said worm gear thereby to rotate said solar radiant energy receiver in accordance with the shrinkage of said shape memory alloy coil.

7. A solar collector including a tracking mechanism for continuously tracking the movement of the sun with time, comprising:
   a solar radiant energy receiver secured to be rotatable about a rotating shaft therefor which is supported by a base having a frame;
   means connected to said solar radiant energy receiver for tracking the movement of the sun with time; and
   means operatively connected to said sun tracking means for rotating said rotating shaft of said solar radiant energy receiver, said sun tracking means comprising at least a pair of compound parabolic concentrators secured to horizontal edges of said solar radiant energy receiver in parallel to said rotating shaft and solar cell modules each secured to a respective compound parabolic concentrator at a position coincident with the focal line thereof.

8. The solar collector according to claim 7 wherein said means for rotating said rotating shaft comprises an electric motor, a switching circuit operatively connected to said electric wire connected to said solar cell module to drive said electric motor forwardly or reversely in accordance with the electric power from said solar cell module, a worm gear mounted on a drive shaft of said electric motor, and a worm wheel secured to said base and meshed with said worm gear thereby to rotate said solar radiant energy receiver in accordance with the electric power from said solar cell.

9. The solar collector according to claim 7, wherein each of said solar cell modules is operatively connected to said means for rotating said rotating shaft of said solar radiant energy receiver through an electric wire for transferring electric output from said solar cell module.

10. The solar collector according to claim 7, wherein said solar radiant energy receiver comprises a parabolic trough reflector.

* * * * *